Patented Sept. 12, 1950

2,522,178

UNITED STATES PATENT OFFICE 2,522,178

16-KETO-ESTROGENS

Max N. Huffman, Dallas, Tex., assignor to G. D. Searle & Co., Chicago, Ill., a corporation of Illinois No Drawing. Application January 29, 1948, Serial No. 5,192

7 Claims. (Cl. 260—397.4)

This invention relates to compounds based on a steroid nucleus and particularly to compounds of the estrane series.

In my copending application, Serial No. 1,057, there is described a process for synthesizing a keto group on the C16 position of a steroid nucleus. Specific illustration and claims therein are made to a process utilizing a 16-oximino derivative of the corresponding steroid, which oximino group may be formed on a steroid having a C17 carbonyl group by a process described by Litvan and Robinson in the "Journal of the Chemical Society", 1997, (1938). Subsequently, a keto group is substituted for the oximino group by the reaction steps of isonitroso bisulphite formation and hydrolyzation.

Invention herein resides in the manufacture of certain of the 16-keto-steroid compounds which have not heretofore been produced; that is, compounds which have not been isolated from natural glandular secretions of animal or plant life, nor have they been produced and isolated synthetically.

I have succeeded in producing 16-keto-estrone-(I), and I have even succeeded in purifying and recrystallizing the final reaction products to produce 16-keto-estrone in fine crystalline form of pale yellow microscopic crystals decomposing at 234 to 238° C. 16-keto-estrone is of particular importance as a chemical intermediate in the synthesis of hormones, and it operates additionally by itself to supplement, inhibit, or replace the natural or abnormal glandular hormone secretions of the human body.

I have also succeeded in producing various ether derivatives of 16-keto-estrone, such, for example, as the ethyl, propyl, butyl, isobutyl, allyl, benzyl, and phenyl ethers.

Invention also resides in the production of other 16-keto-estrogens, such, for example, as 16-keto-equilenin(II), 16-keto-equilin(III), and ether derivatives thereof, wherein the hydrogen atom on the 3 hydroxyl group in either 16-keto-equilin or 16-keto-equilenin is substituted by a monovalent R group representative of aliphatic, aromatic, mixed aliphatic-aromatic, and heterocyclic organic radicals which may be saturated or unsaturated, substituted or unsubstituted. Illustrative of the R groups which may be used to form the corresponding 3-ethers of 16-keto-equilin(IV) or 16-keto-equilenin(V) are methyl, ethyl, propyl, benzyl, phenyl, naphthyl, allyl, furfuryl, and the like. These estrogens also are important in hormone chemistry and the metabolic reactions.

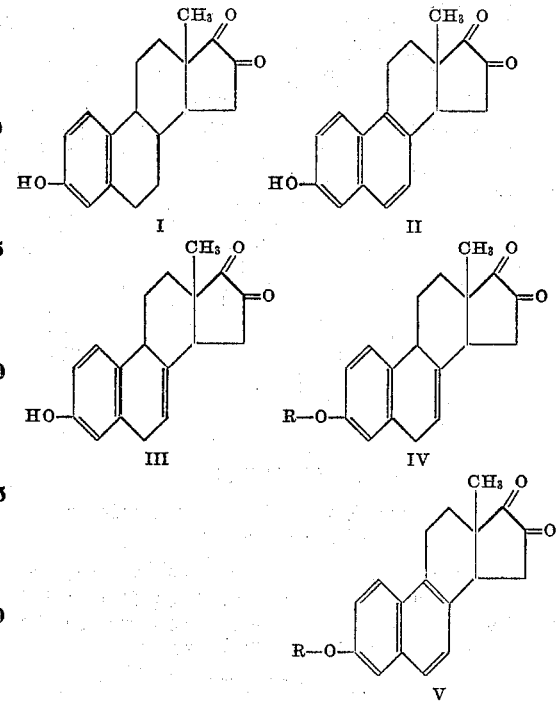

The 16-keto-estrogens may be prepared by the method described in the copending application referred to, wherein the corresponding 16-oximino-estrogen is reacted to form the isonitroso-bisulphite intermediate reaction product which is subsequently reacted in acidulous aqueous medium to hydrolyze the substituted oximino group and form a keto group on the C16 position thereby to form the corresponding 16-keto-estrogen.

The following examples are specific illustrations of processes for preparing compounds embodied in this invention:

EXAMPLE I

*The preparation of 16-keto-estrone*

A mixture of 500 mg. of 16-oximino-estrone (VI), 5 gr. of anhydrous sodium sulphite, and 20 cc. of acetic acid is heated on a steam bath for about 15 minutes with frequent stirring. After dilution with about 5 cc. of water, heating is continued for about 45 minutes with frequent agitation. When cooled, the mixture, in which the greater portion of the oximino-estroid is reacted to the isonitroso-bisulphite estroid (VII) intermediate reaction product, is transferred to a separatory funnel with the aid of about 200 cc. of 3 percent sodium bisulphite. The separated aqueous phase is shaken with about 250 cc. of ethyl ether, from which it is separated, and the ether phase is further extracted with additional portions of dilute sodium bisulphite to recover all of the estroid derivatives, there being a possibility that small amounts of the 16, 17-diketo derivative may be formed which, when reacted with bisulphite to form the bisulphite addition product, becomes water-soluble and reenters the aqueous phase. To the combined bisulphite phases, about 30 cc. of concentrated hydrochloric acid and a few very small porous chips are added. After the acidified solution has been heated for a sufficient length of time on the steam bath, the crystals of 16-keto-estrone are formed by gradual cooling to room or refrigerated temperatures. The crystals are separated by filtration and copiously washed with water.

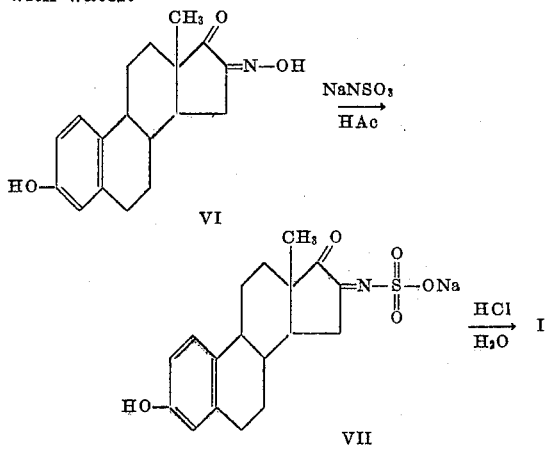

EXAMPLE II

*The preparation of 16-keto-equilenin or 16-keto-equilin*

The process corresponds generally to that described in Example I except that 16-oximino equilenin or 16-keto-equilin is substituted in the initial reaction for 16-oximino estrone.

EXAMPLE III

*The preparation of the 3-benzyl ether of 16-keto-estrone*

The 16-isonitroso-bisulphite water-soluble reaction product of 16-oximino-estrone-3-benzyl ether is prepared by the reaction of 500 mg. of the 16-oximino-estrone-3-benzyl ether with an excess of an alkali metal bisulphite or sulphite, such as 5 gr. of sodium or potassium bisulphite or an alkali metal sulphite, in the presence of an organic acid, such as about 20 cc. of acetic acid. The mixture is heated to about 90° C. for 15 minutes and then with the addition of about 5 cc. of water, heating is continued with stirring for another 45 minutes or until the ebullition of gases has ceased. The isonitroso-bisulphite intermediate reaction product of the estroid-3-benzyl ether is in the aqueous phase which is separated. This phase is washed with solvents, such as ethyl ether, and the other phase is extracted with aqueous solutions of bisulphite to recover the greater portion of the steroid. Further to insure maximum recovery of the expensive estroid, the ether phase is extracted with increments of dilute bisulphite. Upon acidification of the aqueous phase containing the isonitroso-bisulphite reaction product, the substituted isonitroso group is replaced by an oxo group which estroid is relatively insoluble in cold aqueous medium so that crystals form on slowly cooling the acidified solution. The acid may be a mineral acid, for instance, from 20 to 50 cc. of concentrated hydrochloric acid is sufficient, and crystallization may be effected overnight while slowly cooling to room temperature.

Another feature of this invention resides in the production of these estroid derivatives in microscopic crystalline form of high purity. I have found that such crystalline products may be formed by "salting out" the crystals from the aciduous aqueous medium. For this purpose, water-soluble metal salts are added to the acidified solution. For example, pale yellow microscopic crystals of 16-keto-estrone decomposing at 234 to 238° C. are secured when about 50 gr. of sodium chloride are added to the acidified solution in the previous example followed with heating and stirring for about 30 minutes and then slowly cooling the solution to room temperature or less. The crystals may be separated, washed with water, and dried in vacuo. For further purification, the 16-keto-estrone may be reacted with bisulphite to form bisulphite addition products from which further purified 16-keto-estrone is regenerated by hydrolyzation.

Other estroid ethers described may be produced by substitution of the corresponding substituted estroid for the 3-benzyl ether in the above example.

It will be understood that I have produced a series of estrogen compounds which heretofore have been unknown. It will be understood also that other modifications and derivatives of the 16-keto-estrogens may be produced without departing from the spirit of the invention, especially as defined in the following claims.

I claim as my invention:

1. A 16-keto-estrogen having the formula

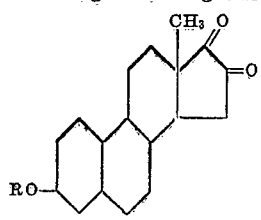

where the estrogen nucleus is selected from the group based upon the nucleus of estrone, equilin and equilenin and where R is selected from the group consisting of hydrogen and benzyl.

2. A 16-keto-estrone having the formula

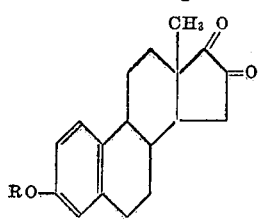

where R is a monovalent group selected of hydrogen and benzyl.

3. A 16-keto-equilenin having the formula

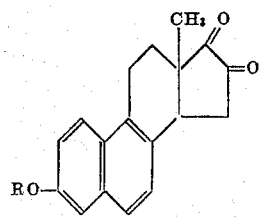

where R is a monovalent group selected of hydrogen and the benzyl radical.

4. A 16-keto-equilin having the formula

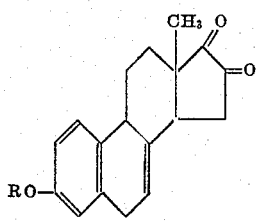

where R is a monovalent group selected of hydrogen and the benzyl radical.

5. 16-keto-equilenin.
6. 16-keto-equilin.
7. 16-keto-estrone-3-benzyl ether.

MAX N. HUFFMAN.

REFERENCES CITED

The following references are of record in the file of this patent:

UNITED STATES PATENTS

| Number | Name | Date |
|---|---|---|
| 2,208,942 | Kaiser | July 23, 1940 |

OTHER REFERENCES

Huffman, Jour. Am. Chem. Soc., vol. 64, pages 2235–2236 (1942).